US010086256B2

United States Patent
Bushong, Jr.

(10) Patent No.: US 10,086,256 B2
(45) Date of Patent: Oct. 2, 2018

(54) SNOWBOARD CONVERSION KIT

(71) Applicant: Jerome Patrick Bushong, Jr., Newtown Square, PA (US)

(72) Inventor: Jerome Patrick Bushong, Jr., Newtown Square, PA (US)

( * ) Notice: Subject to any disclaimer, the term of this patent is extended or adjusted under 35 U.S.C. 154(b) by 0 days.

(21) Appl. No.: 15/560,429

(22) PCT Filed: Mar. 7, 2017

(86) PCT No.: PCT/US2017/021020
§ 371 (c)(1),
(2) Date: Sep. 21, 2017

(87) PCT Pub. No.: WO2017/155903
PCT Pub. Date: Sep. 14, 2017

(65) Prior Publication Data
US 2018/0065028 A1    Mar. 8, 2018

Related U.S. Application Data

(60) Provisional application No. 62/306,226, filed on Mar. 10, 2016.

(51) Int. Cl.
*A63C 10/00* (2012.01)
*A63C 10/02* (2012.01)
(Continued)

(52) U.S. Cl.
CPC ............ *A63C 10/02* (2013.01); *A63C 10/005* (2013.01); *A45F 2005/1013* (2013.01); *A63C 2203/06* (2013.01); *B62B 15/00* (2013.01)

(58) Field of Classification Search
CPC ... B62B 17/061; B62B 17/067; B62B 17/068; B62B 17/063; B62B 33/12; B62B 33/04;
(Continued)

(56) References Cited

U.S. PATENT DOCUMENTS

| 2,348,964 | A | * | 5/1944 | Dodson | ............... | A45C 3/04 |
| | | | | | | 229/117.09 |
| 4,310,169 | A | * | 1/1982 | Brough | ............... | A63C 5/03 |
| | | | | | | 280/14.1 |

(Continued)

FOREIGN PATENT DOCUMENTS

| DE | 202006001378 | 4/2006 |
| DE | 202008000489 | 3/2008 |
| DE | 102007026835 | 10/2008 |

OTHER PUBLICATIONS

"Prodaptive Develops the Twinrider for Paraplegic Snowboarding", Twinrider, Dec. 31, 2014. 4 pages.

(Continued)

*Primary Examiner* — Emma K Frick
(74) *Attorney, Agent, or Firm* — Joseph E. Maenner; Petock & Petock, LLC

(57) ABSTRACT

In described embodiments, a snowboard conversion kit includes a first strap assembly having a first hollow strap sleeve having a first end, a second end, distal from the first end, and a cutout between the first end and the second end. A first strap has a first strap end that extends into the first hollow strap sleeve from the first end and a second strap end that extends into the first hollow strap sleeve from the second end. The first strap and the first strap sleeve form a loop. A first strap securing assembly is adapted to extend through the first hollow strap sleeve and secure the first hollow strap sleeve to a snowboard. A second strap assembly, similar to the first strap assembly is also provided.

16 Claims, 24 Drawing Sheets

(51) Int. Cl.
*A45F 5/10* (2006.01)
*B62B 15/00* (2006.01)

(58) Field of Classification Search
CPC ..... B62B 15/00; B62B 15/007; Y10T 16/513; A63C 10/005; A63C 5/02; A63C 5/031; A63C 5/033; A45F 5/10; A45F 2005/1013; A45C 13/30; A45C 13/26; A45C 2013/306
USPC .................. 441/39, 69, 54, 125; 16/409, 428
See application file for complete search history.

(56) References Cited

U.S. PATENT DOCUMENTS

| | | | | |
|---|---|---|---|---|
| 4,488,748 | A * | 12/1984 | Burkes | A63C 11/025 294/147 |
| 4,669,992 | A * | 6/1987 | Morris | B63B 35/81 114/363 |
| 4,676,521 | A | 6/1987 | Monreal | |
| 4,791,702 | A * | 12/1988 | McVey | A45F 5/10 16/428 |
| 4,915,400 | A * | 4/1990 | Chambers | A63C 5/03 280/14.27 |
| 4,918,785 | A * | 4/1990 | Spinner | F16G 11/14 16/428 |
| 5,009,441 | A * | 4/1991 | Toft | A63C 10/02 24/129 A |
| 5,131,707 | A * | 7/1992 | Zazzara | A45F 5/10 294/153 |
| 5,257,953 | A | 11/1993 | Gillis | |
| 5,348,327 | A * | 9/1994 | Gieske | B63B 35/7946 114/344 |
| 6,634,657 | B2 * | 10/2003 | Graham | A63C 5/16 280/14.27 |
| 6,776,424 | B2 | 8/2004 | Sellers | |
| 7,093,324 | B2 * | 8/2006 | Udy | A45F 3/14 16/428 |
| 7,165,775 | B1 * | 1/2007 | Sellers | B62B 15/00 280/18 |
| 7,296,816 | B2 * | 11/2007 | Wilnau | B60R 9/08 280/414.2 |
| 7,922,206 | B2 | 4/2011 | Kriezel | |
| 8,128,102 | B1 * | 3/2012 | Brown | A63C 5/03 280/18 |
| 8,308,172 | B2 | 11/2012 | Gulbranson | |
| 8,322,731 | B1 * | 12/2012 | Brown | A63C 5/03 280/16 |
| 8,371,630 | B2 * | 2/2013 | Huang | A45F 5/10 220/760 |
| 8,517,410 | B2 | 8/2013 | Pedersen et al. | |
| 8,955,197 | B2 * | 2/2015 | Bailey | A45F 5/102 16/406 |
| 9,126,097 | B2 * | 9/2015 | Fettig | A63C 11/023 |
| 9,205,321 | B2 * | 12/2015 | Geiger | A63C 10/28 |
| 2003/0177610 | A1 * | 9/2003 | Szyjakowski | B62B 5/068 16/428 |
| 2004/0178243 | A1 * | 9/2004 | Clark | A45C 3/00 224/314 |
| 2006/0027982 | A1 * | 2/2006 | Smith | A63C 5/033 280/27 |
| 2007/0096411 | A1 | 5/2007 | Rempe, II | |
| 2008/0061573 | A1 * | 3/2008 | Lamson | A45F 5/10 294/150 |
| 2015/0157923 | A1 | 6/2015 | Nejad | |
| 2016/0021868 | A1 * | 1/2016 | Martinez | A01M 31/006 280/19 |
| 2017/0341675 | A1 * | 11/2017 | James-Jolly | B62B 15/00 |

OTHER PUBLICATIONS

"Original Ski Skooter, Foldup Snowboard KickScooter for Use on Snow & Grass, Snow Sled, Winter Toys", Geospace, Feb. 3, 2017. 6 pages.
PCT/US2017/021020, International Search Report and Written Opinion, dated Jul. 5, 2017. 8 pages.

* cited by examiner

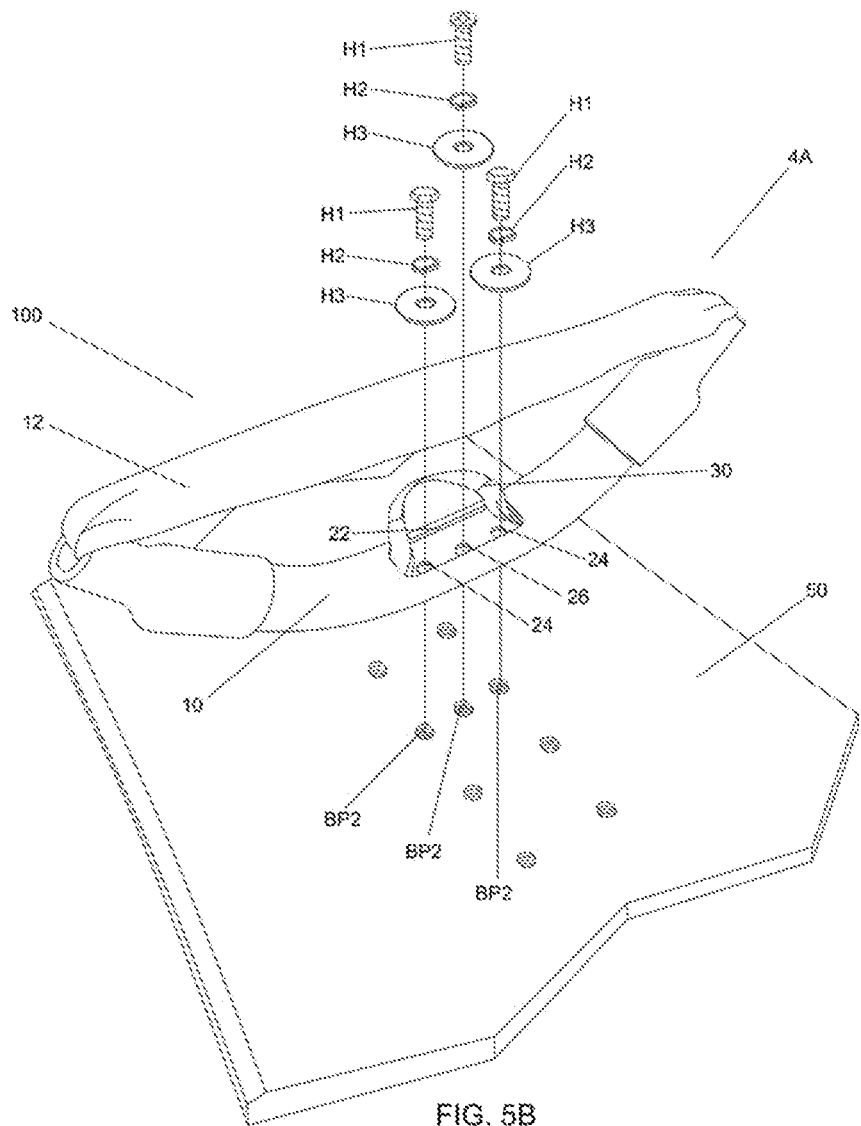

SNOWBOARD CONVERSION KIT

CROSS-REFERENCE TO RELATED APPLICATION

The present invention claims priority from U.S. Provisional Patent Application Ser. No. 62/306,226, filed on Mar. 10, 2016, which is incorporated by reference herein in its entirety.

BACKGROUND OF THE INVENTION

Field of the Invention

The present invention relates to snowboarding equipment, and, in particular, to a kit that can convert a standard snowboard into a sled-like device.

Description of the Related Art

Just about every snowboard owner/operator has attempted, unsuccessfully, with struggle, to ride atop a snowboard in the seated position, at one time or another, while awkwardly grasping onto the existing snowboard boot bindings. This results in an incomplete ride, leaving the rider thirsty for a means to unlock the full potential of what the snowboard has to offer, as if it were operated as a sled.

It would be beneficial to enable a snowboarder to convert his/her snowboard into a sled-like device for a different type of ride than a standard snowboard.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention herein is designed to convert a snowboard into a sled. By means of detaching both boot bindings from the snowboard, allows the user to fasten both a hand strap assembly and a foot strap assembly in place of the original boot bindings, thus allowing the user both maximum comfort and safe control of the snowboard, in the seated position, at the user's lowest point of center of gravity. In addition, the invention solves the problem of operating a snowboard from the seated position, awkwardly grasping the aforementioned boot bindings.

In one embodiment, the present invention is a snowboard conversion kit comprising a first strap assembly having a first hollow strap sleeve having a first end, a second end, distal from the first end, and a cutout between the first end and the second end. A first strap has a first strap end extending into the first hollow strap sleeve from the first end and a second strap end extending into the first hollow strap sleeve from the second end, the first strap and the first strap sleeve forming a loop. A first strap securing assembly is adapted to extend through the first hollow strap sleeve and secure the first hollow strap sleeve to a snowboard. A second strap assembly, similar to the first strap assembly is also provided.

In another embodiment, the present invention is a snowboard conversion kit comprising a hand strap assembly having a hand loop extending through a first sleeve. The first sleeve is adapted to be mounted on a rear portion of a snowboard at a first non-longitudinal angle. A foot strap assembly has a foot loop extending through a second sleeve. The second sleeve is adapted to be mounted on a forward portion of the snowboard at a second non-longitudinal angle.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 5B is an exploded view of a second strap assembly used with the conversion kit shown in FIG. 1A;

DETAILED DESCRIPTION

Figure 1A:
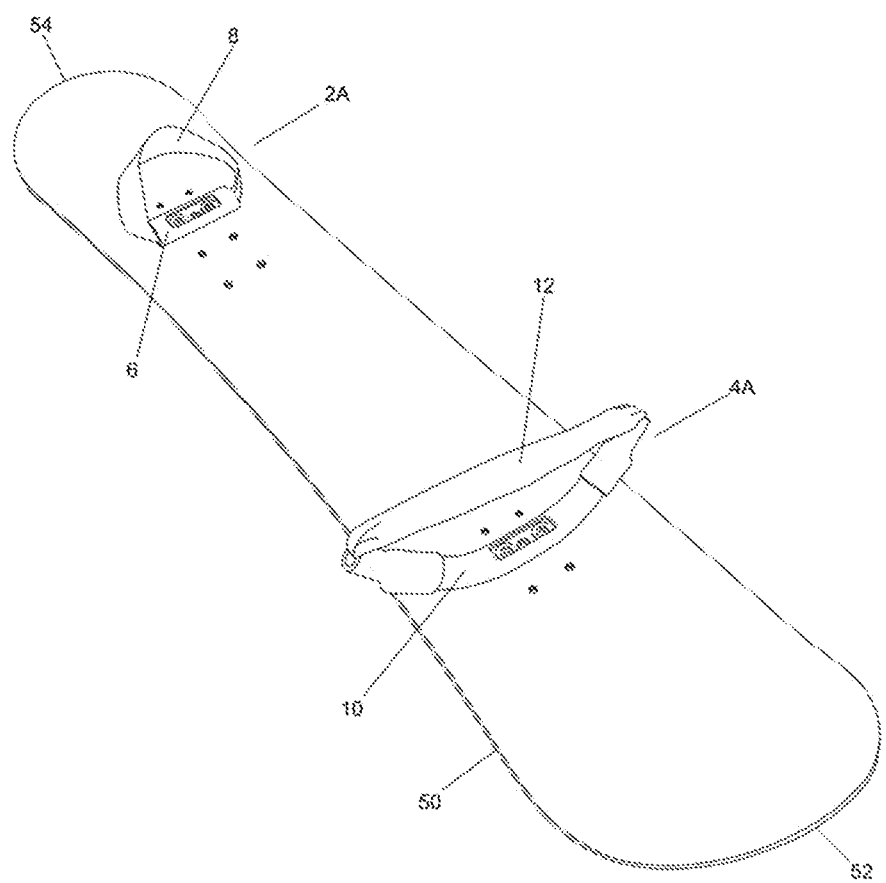
FIG. 1A is a perspective view of a snowboard utilizing a first embodiment of the conversion kit according to the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to FIGS. 1-9B, a first exemplary embodiment of a snowboard conversion kit 100 ("kit 100") according to the present invention allows a rider to replace the snowboard boot bindings (not shown) on a snowboard 50 with kit 100 and ride snowboard 50 like a sled.

The use of kit 100 on snowboard 50 provides a means to control snowboard 50 from the seated position atop the rider support surface of the snowboard 50. Each hand strap assembly and foot strap assembly has a base sleeve element containing holes within them that line up with the bolt pattern on snowboard 50. The foot strap assembly is supported at the front 52 of the snowboard 50. The hand strap assembly is supported at the rear 54 of the snowboard 50. Each assembly also has its own flexible strap element that threads through the base sleeve element end and loops back and fastens to itself.

The various embodiments of the hand strap assembly and foot strap assembly disclosed herein, as well as the various components and features associated with them, are described in the context of snowboards because they have particular utility in this context. However, the devices and methods described herein, as well as their various components and features, can be used in other contexts as well, such as, for example, but without limitation, surfboards, skateboards, other types of board and/or the like.

With reference to FIG. 1A, kit 100 includes two devices, a first, or hand strap, assembly 2A at the rear 54 of the snowboard 50, and a second, or foot strap, assembly 4A at the front 52 of the snowboard. The hand strap assembly 2A, includes a base sleeve 6 and a strap 8, which when configured together with securing members, discussed in detail below with respect to FIGS. 5A and 5B, construct hand strap assembly 2A. Similar to hand strap assembly 2A, foot strap assembly 4A includes a base sleeve 10 and a strap 12.

Figure 1B:
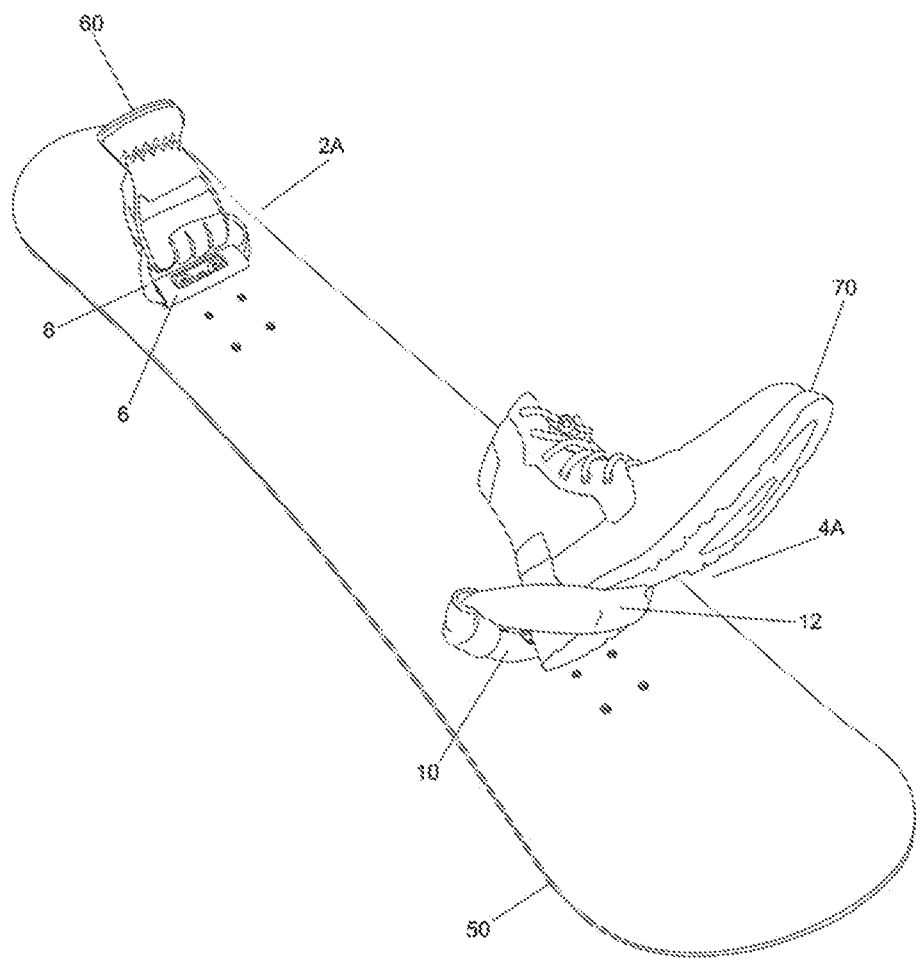
FIG. 1B is a perspective view of the snowboard shown in FIG. 1 being used by a rider.

As shown in FIG. 1B, a rider (not shown) secures their hand 60 in the rear device 2A by grasping the strap element 8 of the hand strap assembly 2A. In addition, the rider secures their foot in the front device 4A by pressing the strap element 12 forward with the bottom of their boot 70, positioning the strap element 12 of the foot strap assembly 4A, just in front of the heel, within the region of the arch of the rider's foot. With the distance between the hand strap assembly 2A and foot strap assembly 4A adjusted and positioned correctly, the base sleeve element 10 of the Foot strap assembly 4A should be located behind the rider's ankle as forward tension is placed on the strap element 12 of the foot strap assembly 4A.

Figures 2A, 2B, 2C:
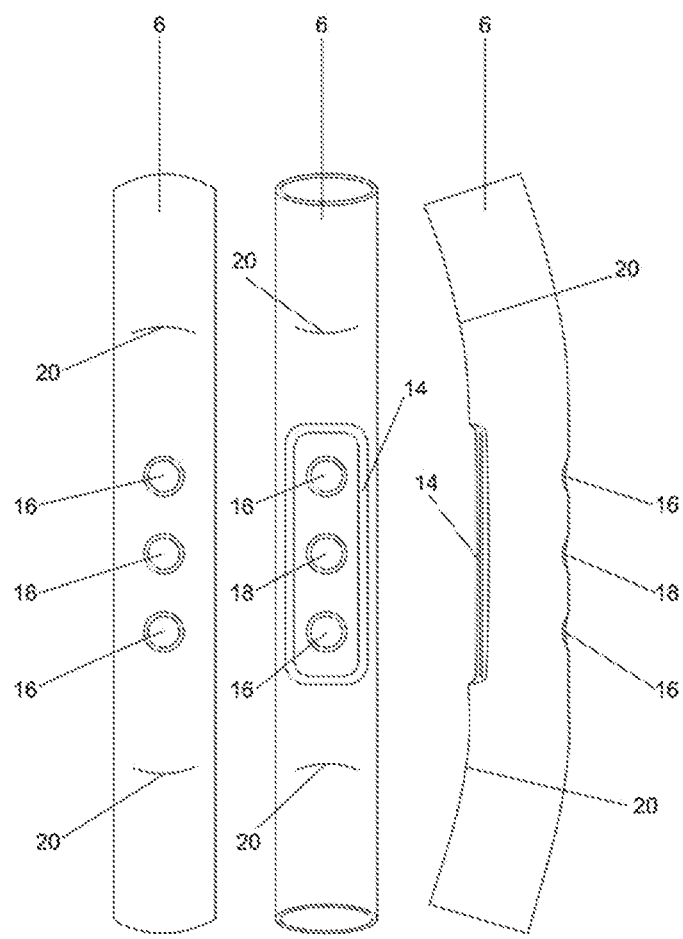
FIG. 2A is a bottom plan view of a first sleeve used with the conversion kit shown in FIG. 1A.
FIG. 2B is a top plan view of the sleeve shown in FIG. 2A.
FIG. 2C is a side elevational view of the sleeve shown in FIG. 2A.

Bottom, top, and side views of one embodiment of a base sleeve element 6 configured for use with a hand strap assembly 2A are illustrated in FIGS. 2A, 2B, and 2C, respectively. According to certain embodiments, the base sleeve element 6 is approximately 4½ inches long, and ¾ inches in width. However, in other arrangements, the length of the base sleeve element 6 can be greater or less than 4½ inches long, and the width can be greater or less than ¾ inches, as desired or required. The base sleeve 6 can be constructed of aluminum for its resistance to corrosion, due to contact with natural elements, and also for its lightweight quality. Optionally, the base sleeve element 6 can include an upward bend 20 having an angle of about 5 degrees, but can have a bend greater than or less than 5 degrees, as desired or required.

As illustrated in FIGS. 2B, and 2C, a cutout in the form of an opening 14 is cut out of the top section of the base sleeve 6, known as the crown, just through to the inside top of the base sleeve 6, known as the obvert. In an exemplary embodiment, opening 14 is oval, although those skilled in the art will recognize that opening 14 can be other shapes. According to certain embodiments of the oval opening 14, the length is 3 inches long, and the width is ½ inch wide. However, in other arrangements of the oval opening 14, the length can be greater or less than 3 inches, and the width can be greater or less than ½ inch, as desired or required. Opposite the oval opening 14 are two outside mounting hardware holes 16, each 5/16 inch in diameter, and one center mounting hardware hole 18, also 5/16 inch in diameter. However in other arrangements, the diameter can be greater or less than 5/16 inch, as desired or required. The distance between the two outside mounting hardware holes 16, is 4 centimeters, from center to center, of each outside mounting hardware hole 16. As desired or required, the mounting hardware holes can be spaced closer or further apart, from center to center, in other arrangements. Furthermore, the purpose of the two outside mounting hardware holes 16 is to be used in conjunction with, but not limited to, standard 2×4, 4×4, and 3D existing snowboard bolt patterns. With reference to the center mounting hardware hole 18, its purpose is to be used in conjunction with, but not limited to, standard 3D, and Channel existing snowboard bolt patterns.

Figures 3A, 3B, 3C:
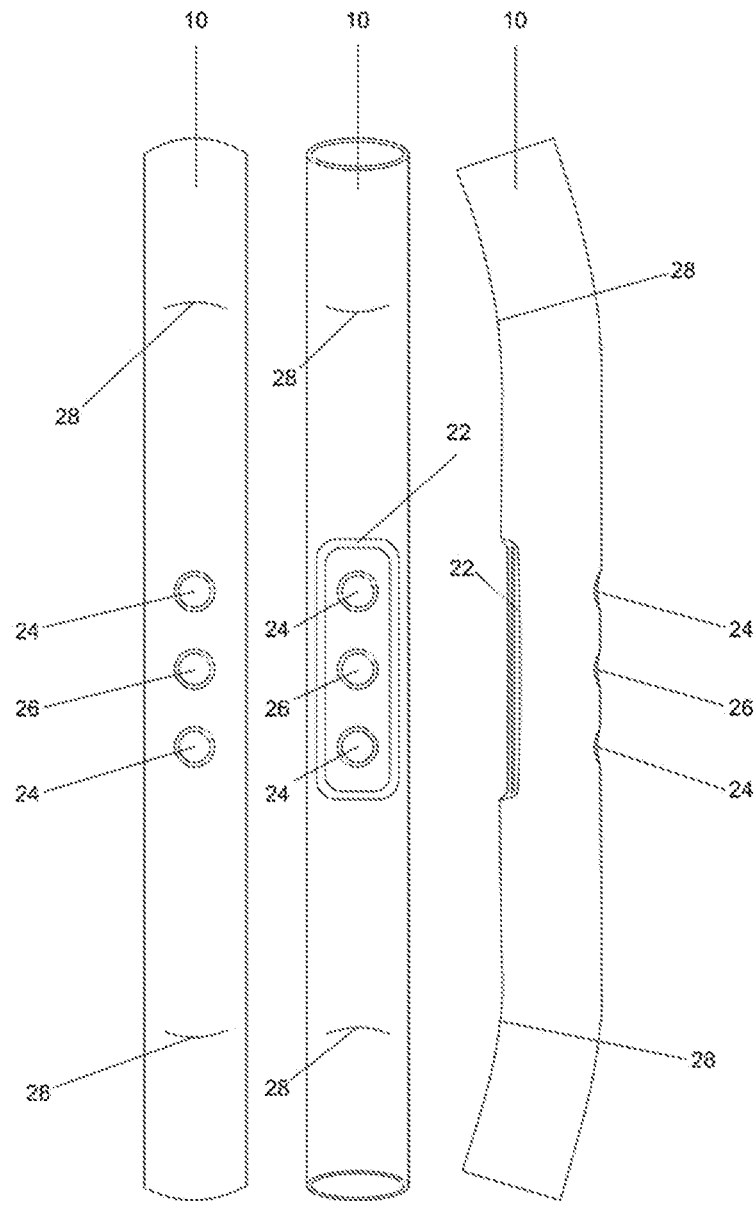
FIG. 3A is a bottom plan view of a second sleeve used with the conversion kit shown in FIG. 1A.
FIG. 3B is a top plan view of the sleeve shown in FIG. 3A.
FIG. 3C is a side elevational view of the sleeve shown in FIG. 3A.

Bottom, top, and side views of one embodiment of a base sleeve element 10, configured for use with a foot strap assembly 4A, are illustrated in FIGS. 3A, 3B, and 3C, respectively. According to certain embodiments, the base sleeve element 10 is approximately 10 inches long, and ¾ inches in width. However, in other arrangements, the length of the base sleeve element 10 can be greater or less than 10 inches long, and the width can be greater or less than ¾ inches, as desired or required. In an exemplary embodiment, the base sleeve 10 can constructed of aluminum for its resistance to corrosion, due to contact with natural elements, and also for its lightweight quality. Those skilled in the art, however, will recognize that other suitable materials can be used. Optionally, the base sleeve element 10, can include an upward bend 28 having an angle of 15 degrees, but can have a bend greater or less than 15 degrees, as desired or required.

As illustrated in FIGS. 3B, and 3C, an opening 22 is cut out of the top section of the base sleeve 10, known as the crown, just through to the inside top of the base sleeve 10, known as the obvert. In an exemplary embodiment, opening 22 is oval, although those skilled in the art will recognize that opening 22 can be other shapes. According to certain embodiments of the oval opening 22, the length is 3 inches long, and the width is ½ inch wide. However, in other arrangements of the oval opening 22, the length can be greater or less than 3 inches, and the width can be greater or less than ½ inch, as desired or required. Opposite the oval opening 22, are two outside mounting hardware holes 24, each 5/16 inch in diameter, and one center mounting hardware hole 26, also 5/16 inch in diameter. However in other arrangements, the diameter can be greater or less than 5/16 inch, as desired or required. The distance between the two outside mounting hardware holes 24, is 4 centimeters, from center to center, of each outside mounting hardware holes 24. As desired or required, the mounting hardware holes can be spaced closer or further apart from center to center in other arrangements. Furthermore, the purpose of the two outside mounting hardware holes 24 is to be used in conjunction with, but not limited to, standard 2×4, 4×4, and 3D existing snowboard bolt patterns. With reference to the center mounting hardware hole 26, its purpose it to be used in conjunction with, but not limited to, standard 3D, and Channel snowboard bolt patterns.

Figure 4A:
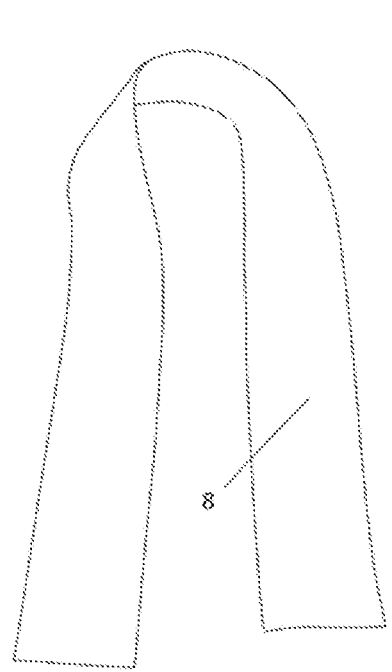
FIG. 4A is a perspective view of a first strap used with the conversion kit shown in FIG. 1A.
Figure 4B:
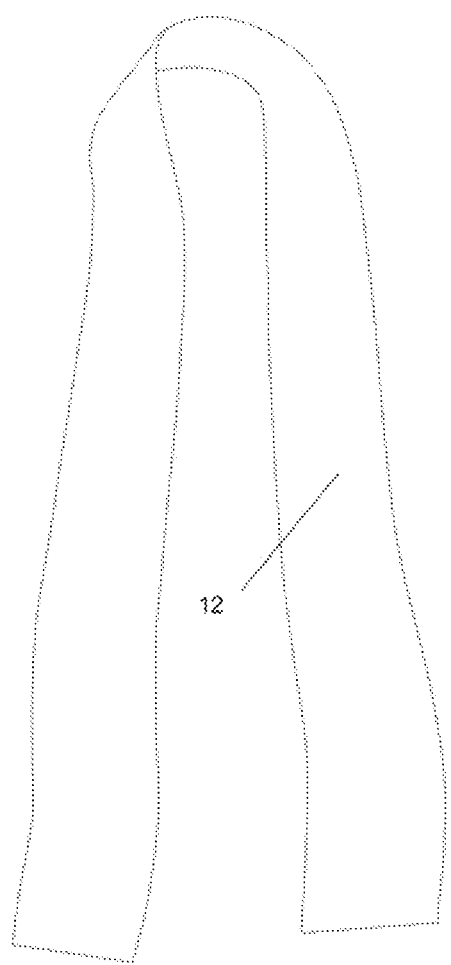
FIG. 4B is a perspective view of a second strap used with the conversion kit shown in FIG. 1A.

FIGS. 4A, and 4B illustrates representation of the hand strap element 8, and foot strap element 12, respectively. The strap elements 8, 12 loop through the aforementioned base sleeve elements 6, 10, respectively, and connect back to itself, end to end, forming an infinite loop. Examples of how the strap element connects back to itself are, but not limited to, weaving each end back through its said self, knot tying each together, heat fusion, or other suitable connection processes. In addition FIG. 4A, a hand strap 8 is 18 inches long end to end, constructed of, but not limited to manila, polypropylene, polyethylene, polyester, nylon, or other suitable materials. In other arrangements, referring to FIG. 4B, foot strap 12, is 32 inches long end to end, constructed of, but not limited to manila, polypropylene, polyethylene, polyester, nylon, or other suitable materials.

Figure 5A:
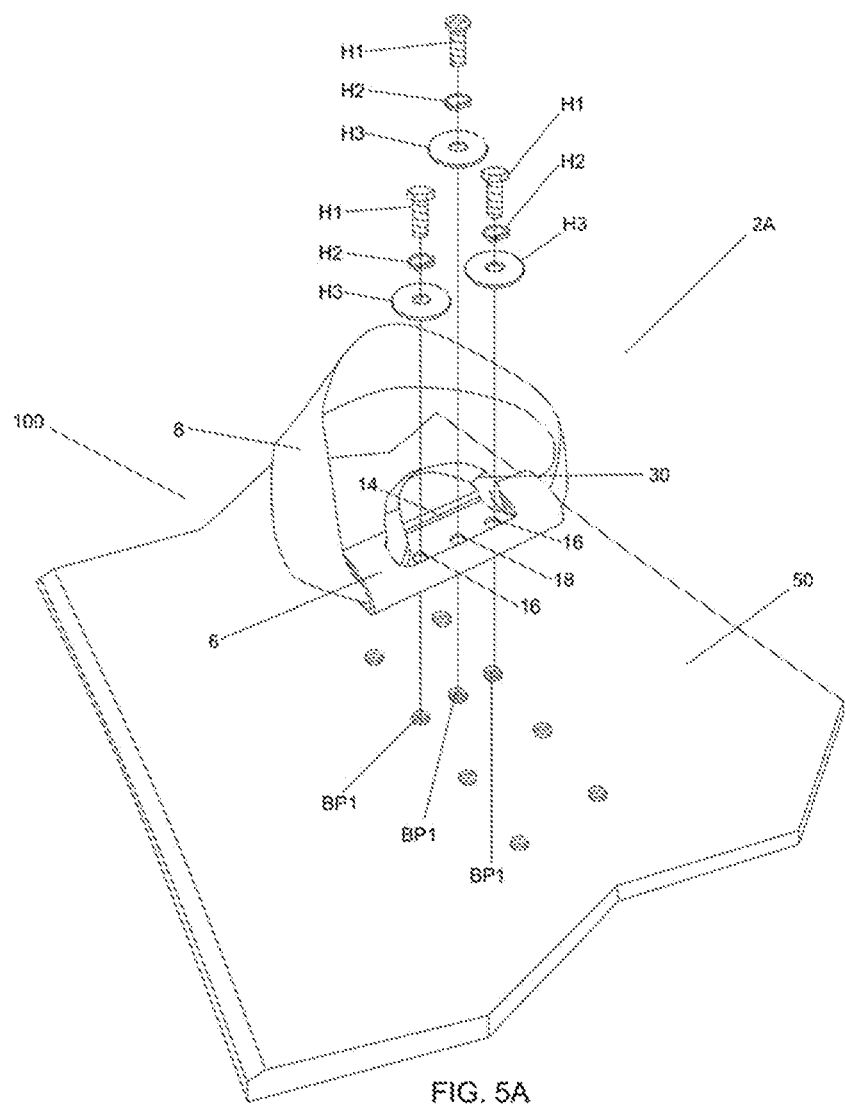
FIG. 5A is an exploded view of a first strap assembly used with the conversion kit shown in FIG. 1A.

FIG. 5A illustrates a perspective exploded view, not to scale, of the assembly configuration of hand strap assembly 2A and a securing assembly in the form of hardware such as bolt/screw H1, lock washer H2, and flat washer H3, for mounting kit 100 to snowboard 50. The mounting process of the hand strap assembly 2A goes as follows, but is not limited to: a bolt/screw H1, inserts through a lock washer H2, then through a flat washer H3, and finally through a mounting hole 16/18 of sleeve mount 6, wherein last bolt/screw H1 threads into a preferred existing Bolt Pattern BP1 hole atop a snowboard 50. As noted above, the strap element 8 threads through the base sleeve 6 and attaches end to end to itself by means of connection 30 within the sleeve 6, and is accessible through the opening 14.

FIG. 5B illustrates a perspective exploded view, not to scale, of the assembly configuration of foot strap assembly 4A and a securing assembly in the form of hardware such as bolt/screw H1, lock washer H2, and flat washer H3, for mounting kit 100 to snowboard 50. The mounting process of the foot strap assembly 4A goes as follows, but is not limited to: a bolt/screw H1, inserts through a lock washer H2, then through a flat washer H3, and finally through a mounting hole 24/26 of sleeve mount 10, wherein last it threads into a preferred existing Bolt Pattern BP2 hole atop snowboard 50. As noted above, the strap element 12 threads through the base sleeve 10 and attaches end to end to it said self, by means of connection 30 within the sleeve 10, and is accessible through the opening 22. Both FIGS. 5A and 5B show that bolts/screws H1 located between strap element 8 and sleeve 6.

Figure 6A:
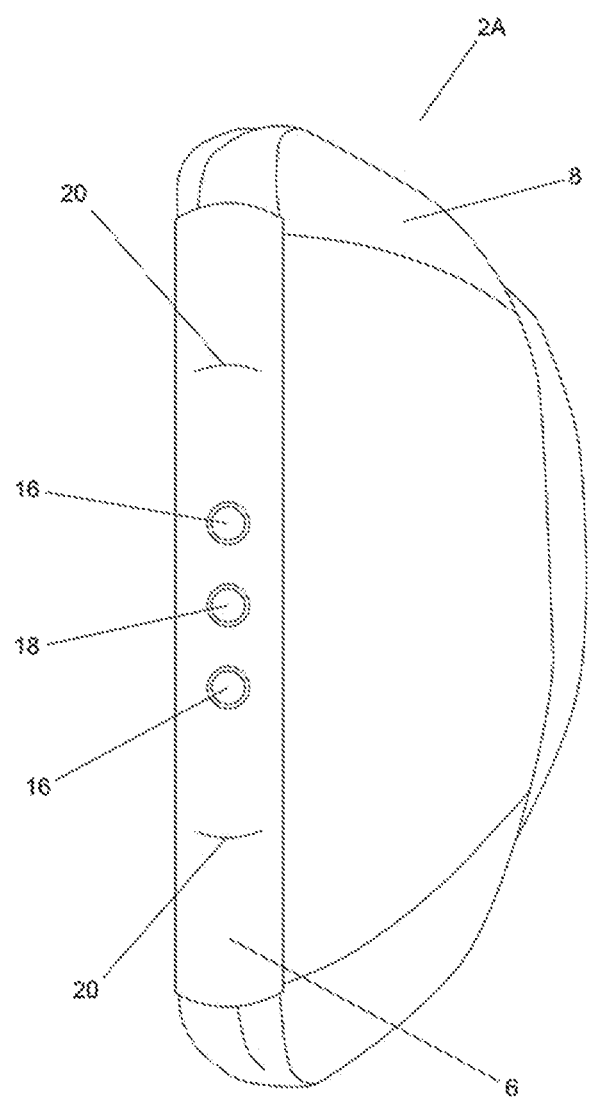
FIG. 6A is a bottom perspective view of the first strap assembly shown in FIG. 5A.
Figure 6B:
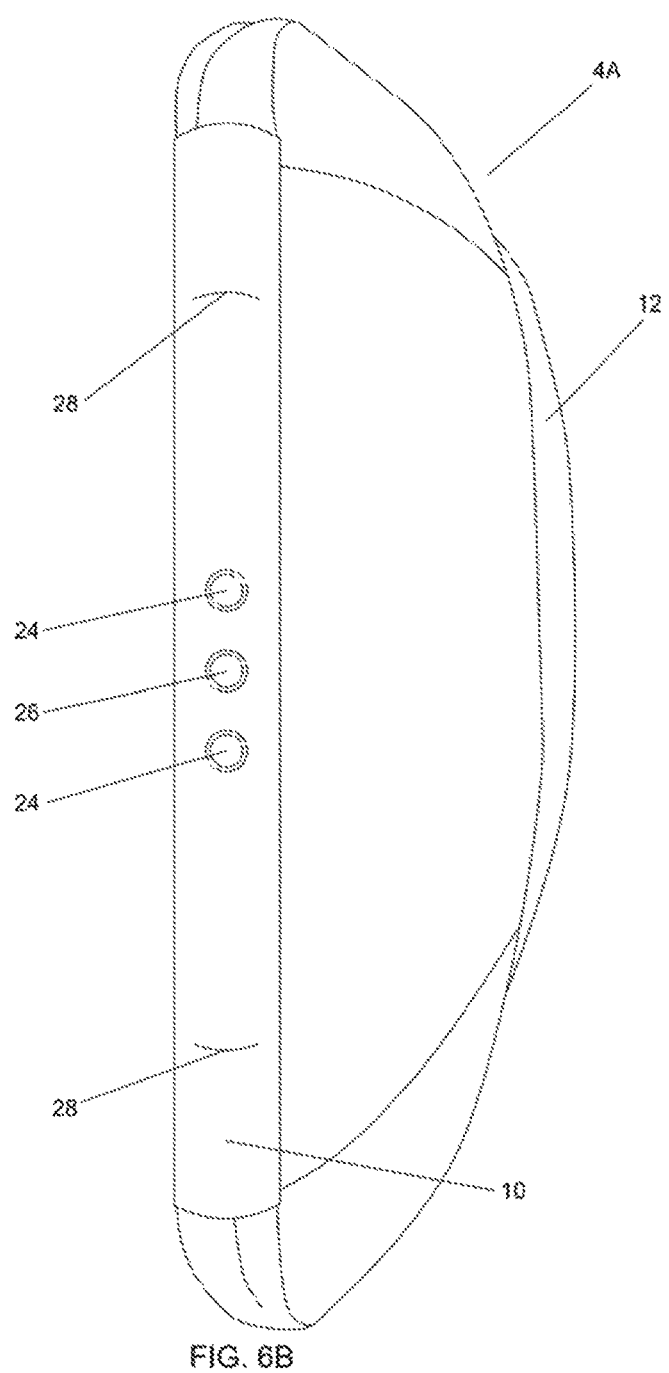
FIG. 6B is a bottom perspective view of the second strap assembly shown in FIG. 5B.

FIG. 6A illustrates a bottom view of one embodiment of the hand strap assembly 2A and FIG. 6B, illustrates a bottom view of one embodiment of the foot strap assembly 4A.

Figure 7A:
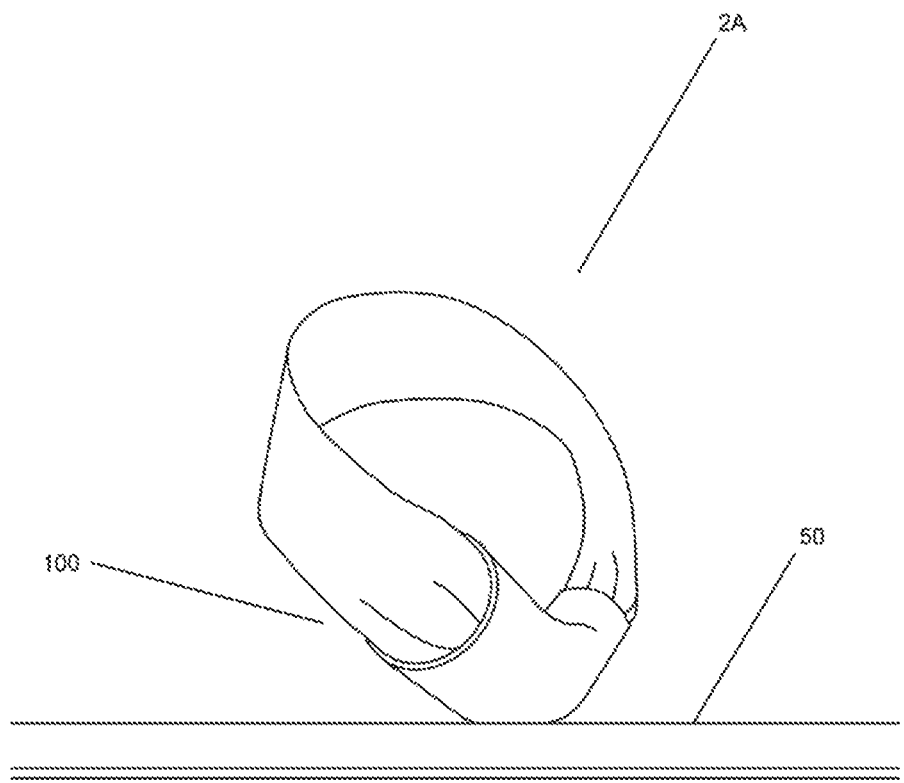
FIG. 7A is a perspective view of the first strap assembly shown in FIG. 5A mounted on a snowboard.
Figure 7B:
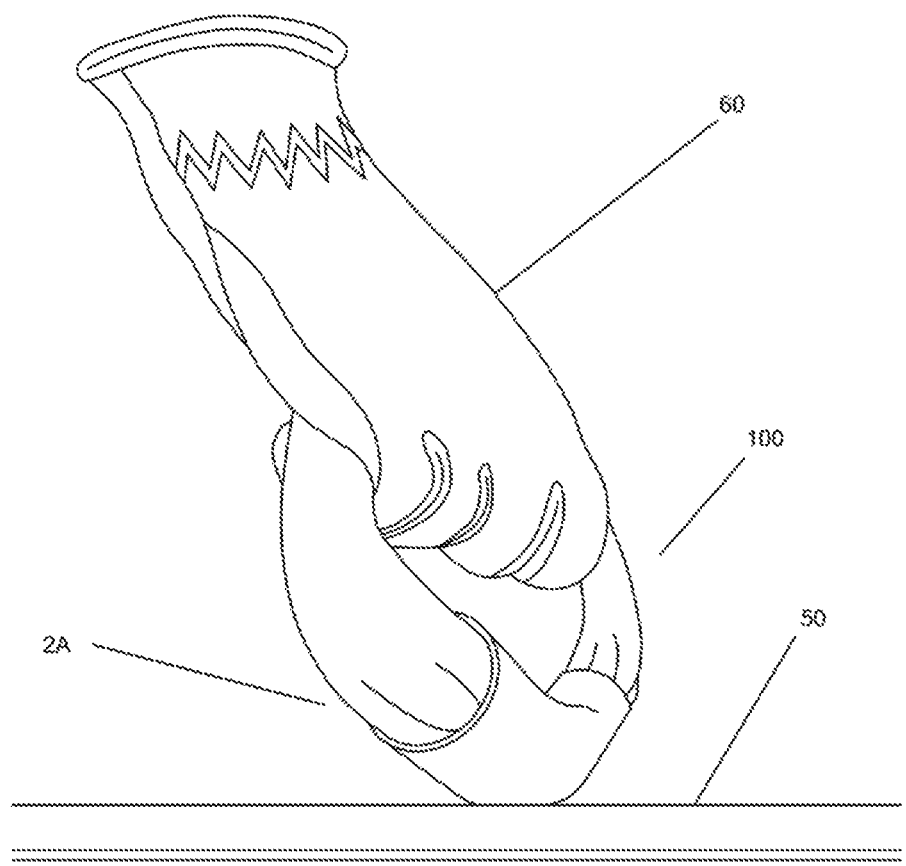
FIG. 7B is a perspective view of a hand engaging the first strap assembly shown in FIG. 7A.

FIG. 7A illustrates a side perspective view of hand strap assembly 2A mounted on snowboard 50, while FIG. 7B is a side perspective view, showing the utility of hand strap assembly 2A, grasped by rider's hand 60. The orientation of the rider's strap can be that of either one hand or both hands, or with hand 60 grasping from front to rear, as shown in FIG. 7B, or from rear to front, depending on the rider's preference.

Figure 7C:
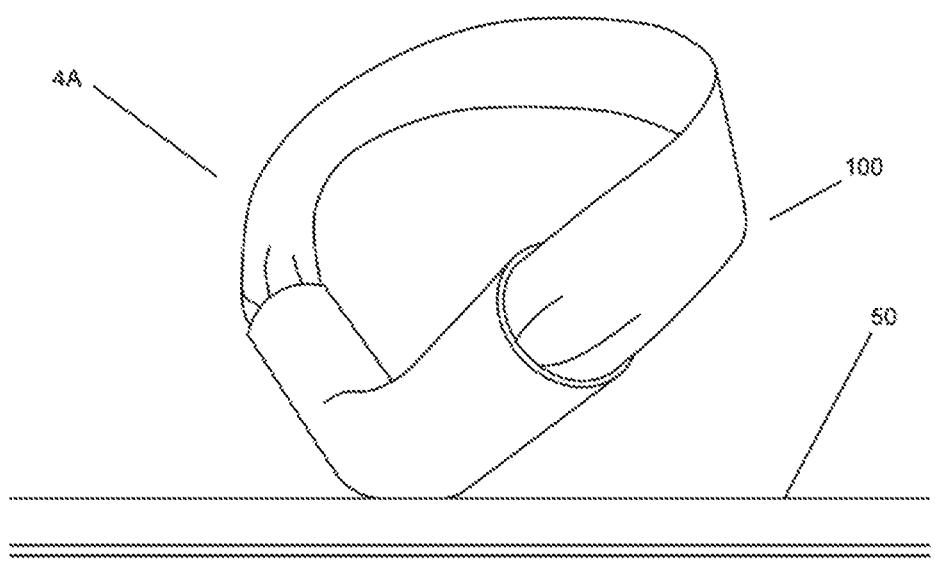
FIG. 7C is a perspective view of the second strap assembly shown in FIG. 5B mounted on a snowboard.
Figure 7D:
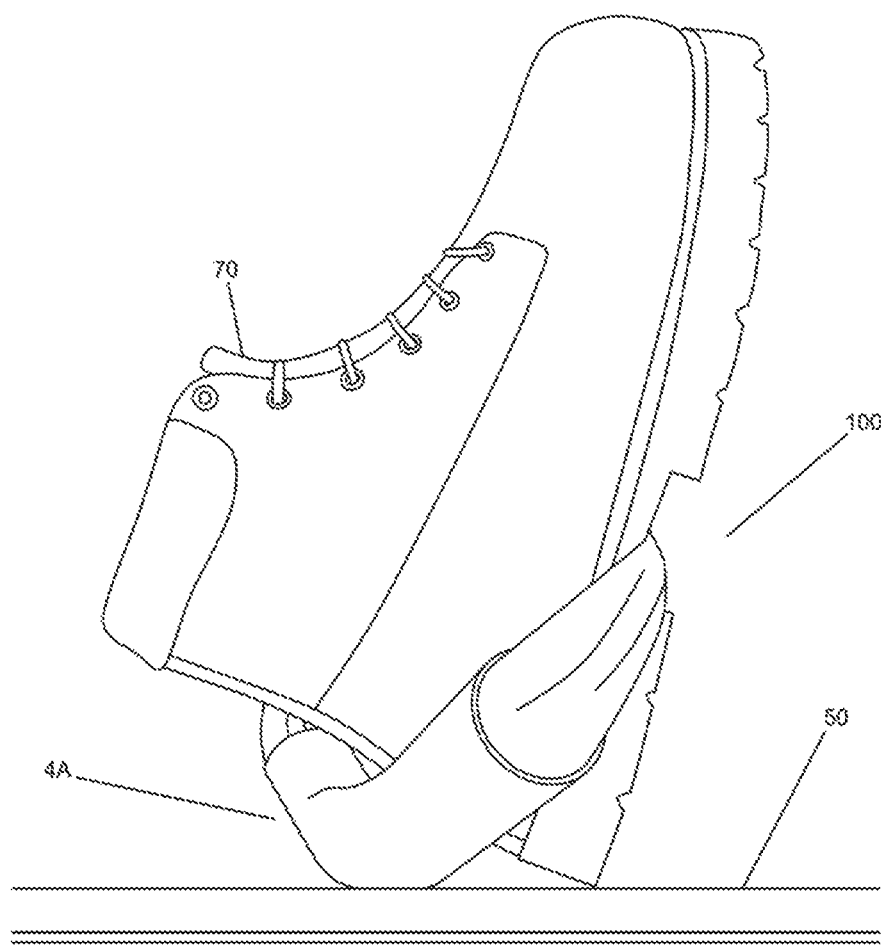
FIG. 7D is a perspective view of a foot engaging the second strap assembly shown in FIG. 7C.

FIG. 7C illustrates a side perspective view of foot strap assembly 4A mounted on snowboard 50, while FIG. 7D is a side perspective view, showing the utility of foot strap assembly 4A in a chocked stance within the sole of rider's boot 70. The orientation of the rider's stance can be that of either one boot 70 or both boots depending on the rider's preference.

Figure 8A:
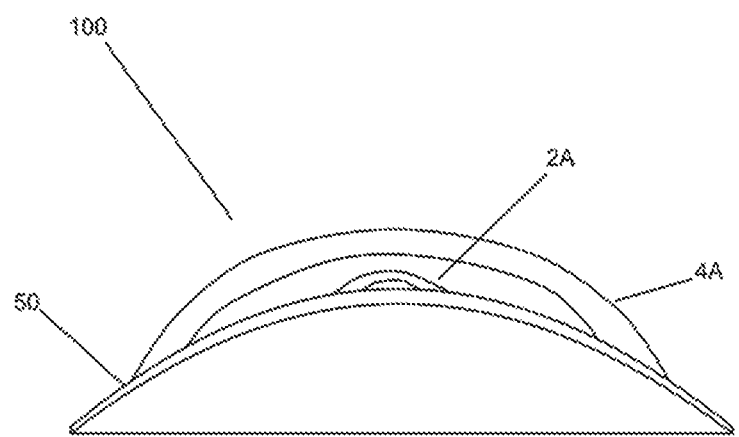
FIG. 8A is a front elevational view of the snowboard shown in FIG. 1A.

FIG. 8A is a front view of kit 100, comprising of both hand strap assembly 2A, and foot strap assembly 4A mounted onto snowboard 50. To reiterate upon the statement made above in the BACKGROUND OF THE INVENTION, FIG. 8A also illustrates the requirement of the rider's center of gravity to be low to the board 50 in order to ride the board 50 as a sled. With that being said, the low profile design of sled 50 with kit 100 improves the balance and handling that rider 80 can achieve from the seated position upon snowboard 50.

Figure 8B:
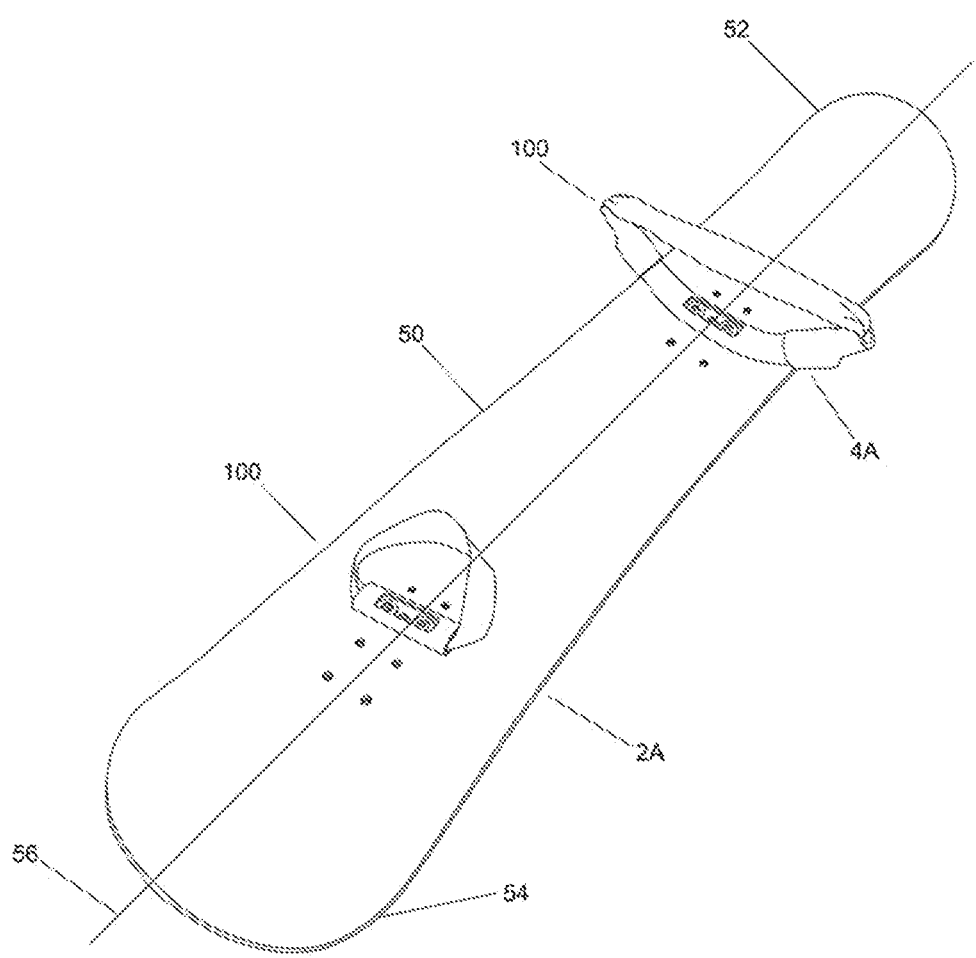
FIG. 8B is a top perspective view of the snowboard shown in FIG. 1A.
Figure 8C:
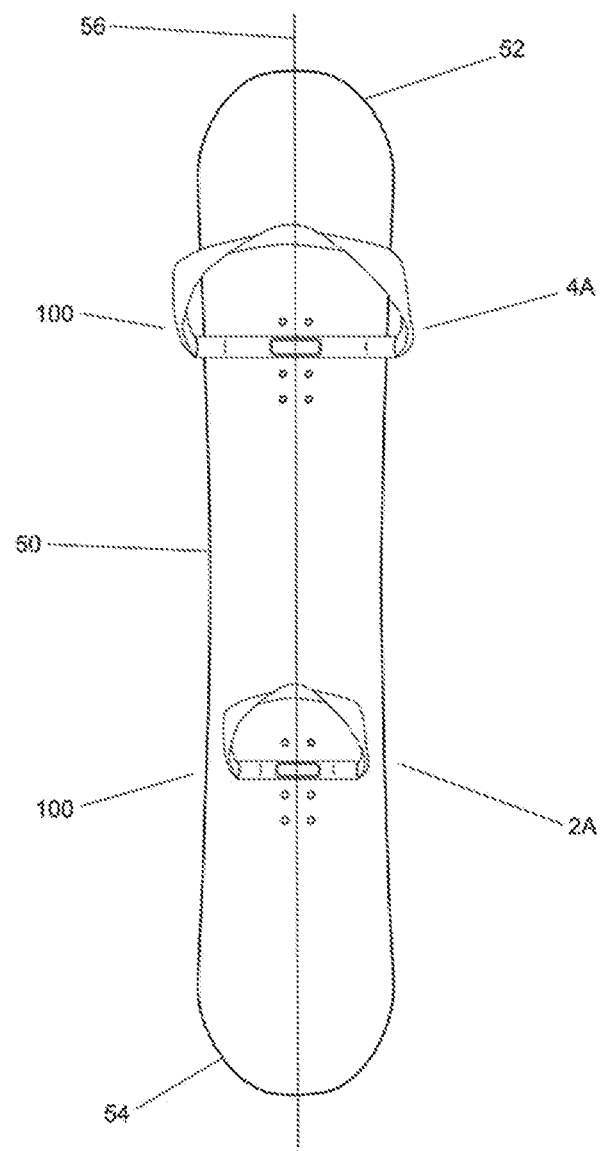
FIG. 8C is a top plan view of the snowboard shown in FIG. 1A.

FIG. 8B illustrates a top perspective view and FIG. 8C illustrates a top plan view of kit 100 comprising both hand strap assembly 2A, and foot strap assembly 4A. Central longitudinal axis 56 of board 50 illustrates that hand strap assembly 2A and foot strap assembly 4A extend at non-longitudinal angles along board 50. In an exemplary embodiment, hand strap assembly 2A and foot strap assembly 4A extend at orthogonal angles relative to longitudinal axis 56.

Figure 9A:
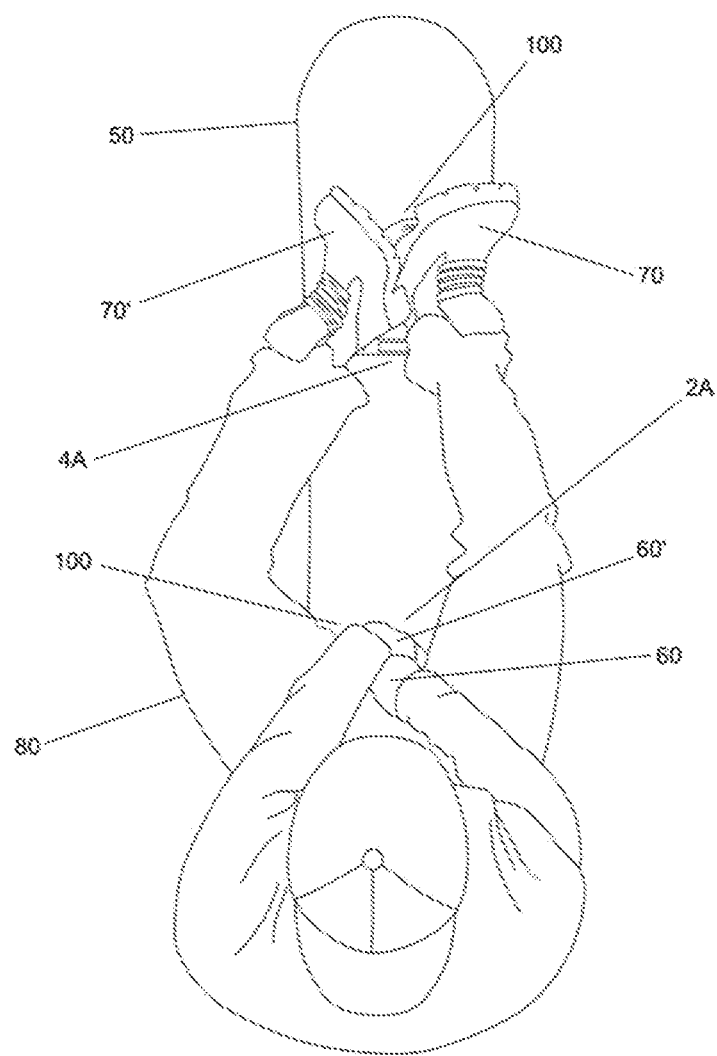
FIG. 9A is a top plan view showing a ride riding the snowboard shown in FIG. 1A using both hands and feet.

FIG. 9A illustrates a top plan view, displaying the utility of kit 100, with a rider 80 in the seated position, atop snowboard 50. The illustration of FIG. 9A portrays the orientation of both the rider's hands 60, 60' grasping the hand strap assembly 2A and the orientation of both the rider's feet 70, 70' chocked within the foot strap assembly 4A.

Figure 9B:
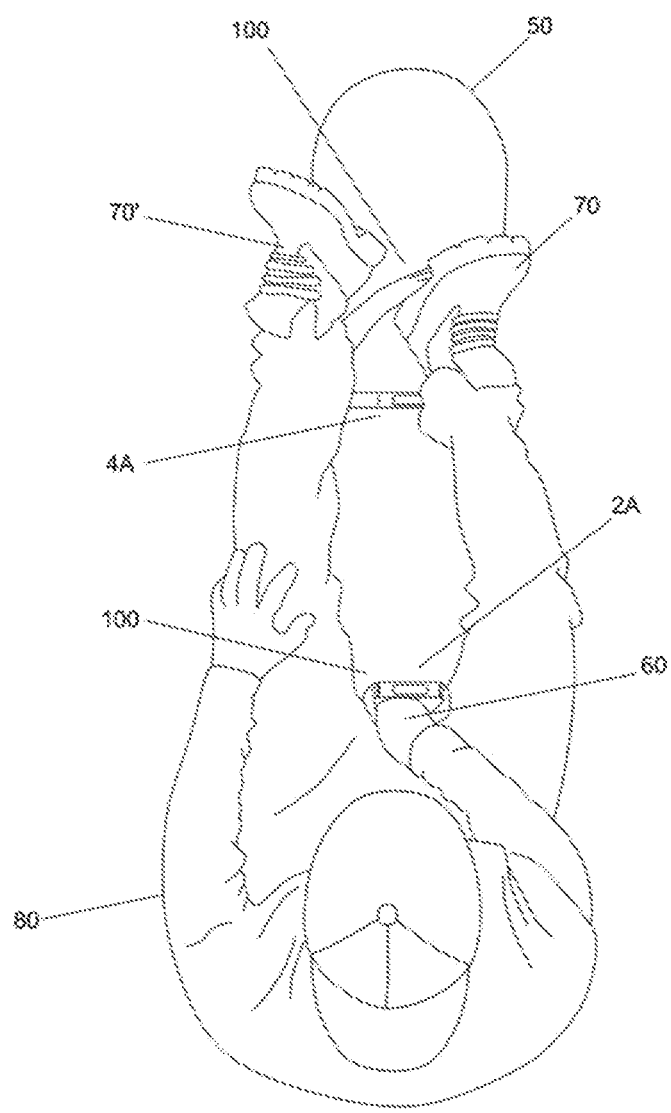
FIG. 9B is a top plan view showing a ride riding the snowboard shown in FIG. 1A using only one each of hands and feet.

FIG. 9B illustrates a top plan view, displaying the rider 80 grasping the hand strap assembly 2A with only a single hand 60 and using only one foot 70 to chock against the foot strap assembly 4A, allowing the other foot 70' to be used such as for counter balancing, or for whatever reason the rider 80 desires to do so.

Figure 10A:
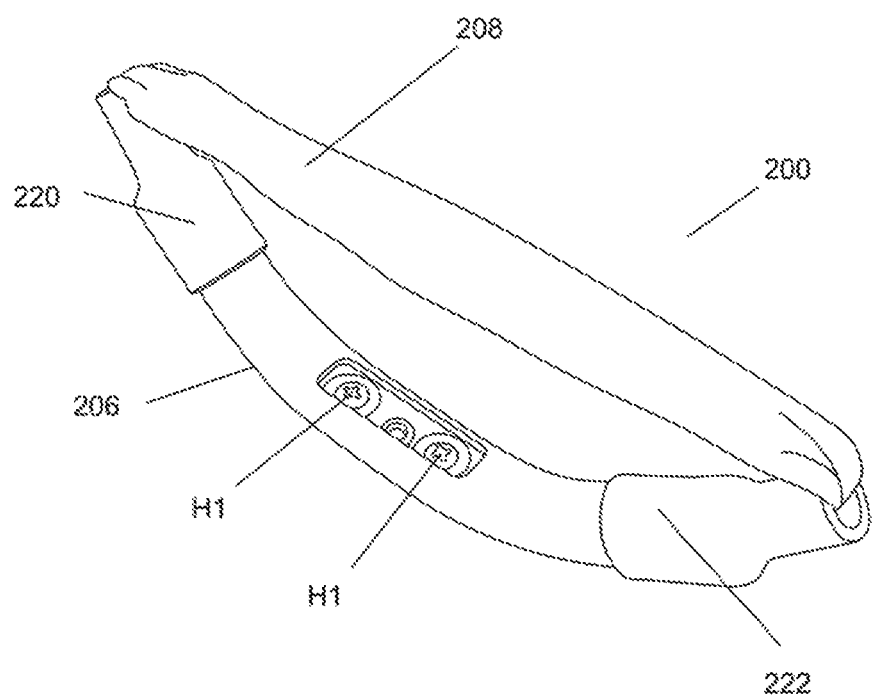
FIG. 10A is a perspective view of a first strap assembly according to an alternative embodiment of the present invention.
Figure 10B:
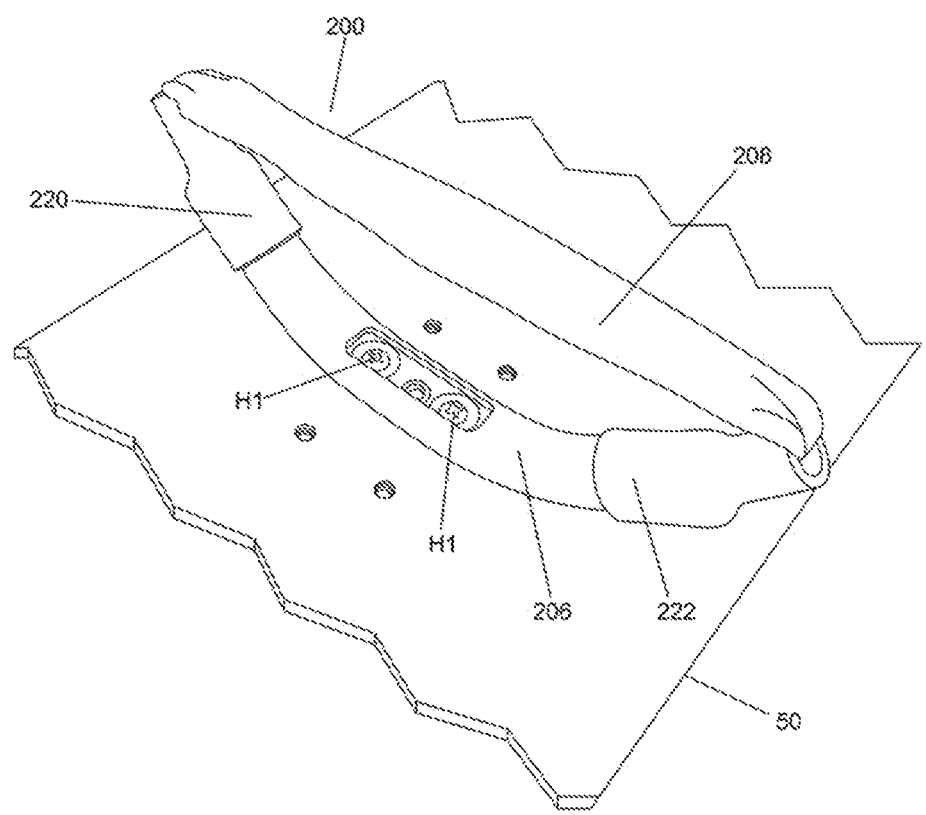
FIG. 10B is a perspective view of a second strap assembly according to an alternative embodiment of the present invention.
Figure 13A:
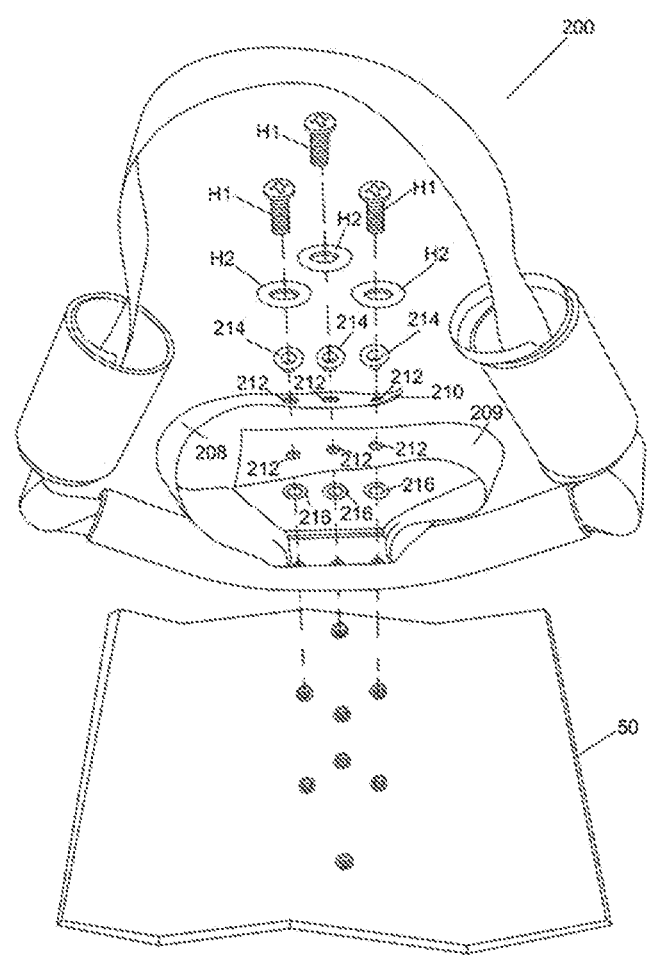
FIG. 13A is an exploded perspective view of the strap assembly shown in FIG. 10B.
Figure 14A:
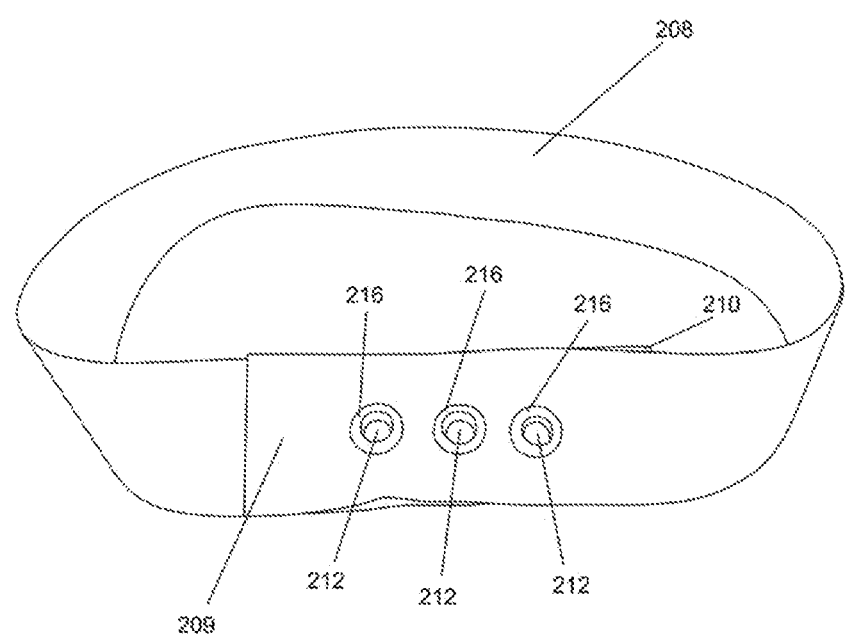
FIG. 14A is a bottom perspective view of the strap shown in FIG. 10B.

An alternative embodiment of a conversion kit 200 ("kit 200") is shown in FIGS. 10A-11A and 13A-14A. Kit 200 is similar to kit 100. However, instead of strap 8, strap 208 is used. Strap 208, shown in detail in FIG. 14A, can have a flat ribbon-type configuration Each end 209, 210 of strap 208 includes a plurality of through-openings 212 extending therethrough. Through-openings 212 on end 209 are aligned with through-openings 212 on end 210 and secured to each other with grommets 214, 216 so that bolt/screw H1 can extend through through-openings 212 to secure strap 208 to board 50, as shown in FIGS. 10A, 13A.

Figure 11A:
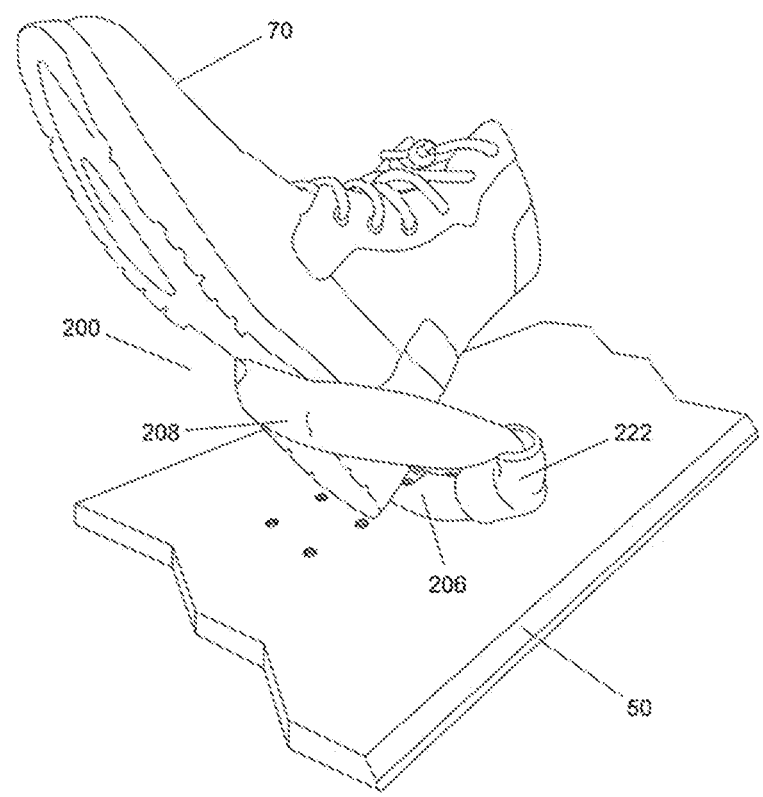
FIG. 11A is a perspective view of a user's foot engaging the second strap assembly shown in FIG. 10B.

Additionally, a sleeve 206 includes extenders 220, 222 on either end thereof. Extenders 220, 222 raise strap 208 above sleeve 206 to enable the rider to better engage strap 208, particularly for boot 70, which may require hand assistance to engage strap 4A in kit 100. FIG. 11A shows how the rider's boot 70 can engage strap 208 with extenders 220, 222 (only extender 222 is shown). In an exemplary embodiment, extenders 220, 222 can be constructed from a pliable material, such as, for example, rubber, although those skilled in the art will recognize that other materials can be used. It is desired to use a soft, pliable material to cushion the rider 80 in the event that the rider 80 should fall on either or both of extenders 220, 222.

Figure 12A:
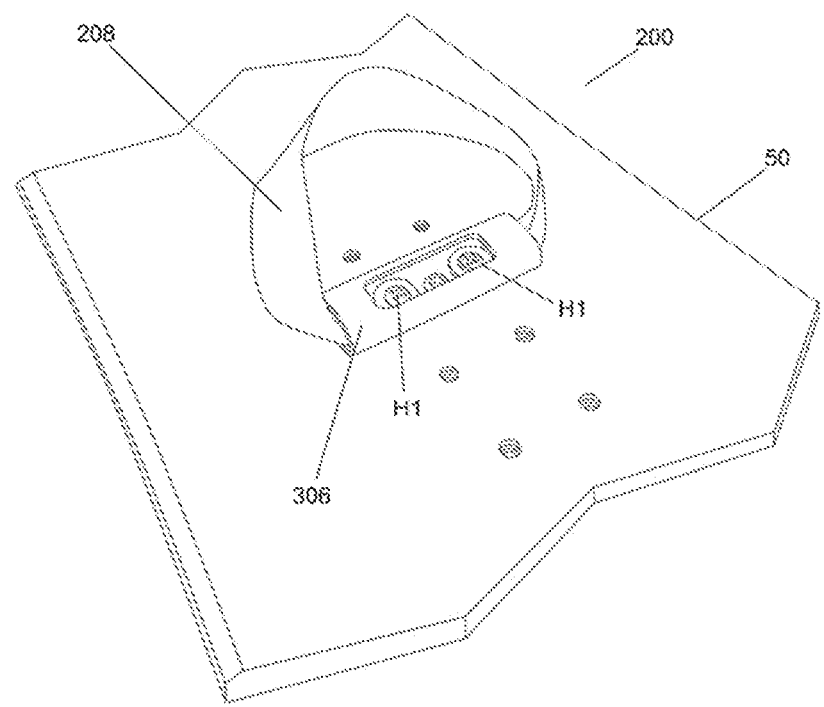
FIG. 12A is a perspective view of a first strap assembly according to another alternative embodiment of the present invention.

Another embodiment of a conversion kit 300 ("kit 300") is shown n FIG. 12A. Kit 300 is similar to kit 200 but, instead of sleeve 206 with extenders 220, 222, kit 300 uses a sleeve 306 without any extenders. Sleeve 306 does not include ends that arc away from board 50 and, as a result, has a lower profile than sleeves 6, 10, or 206

Although the invention has been disclosed in the context of a certain preferred embodiment and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments or variations can be made and still fall within the scope of the invention. It should also be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

I claim:

1. A snowboard conversion kit comprising:
    a first strap assembly having:
    a first hollow strap sleeve having a first end, a second end, distal from the first end, and a cutout between the first end and the second end;
    a first strap having a first strap end extending into the first hollow strap sleeve from the first end and a second strap end extending into the first hollow strap sleeve from the second end, the first strap and the first strap sleeve forming a loop;
    a first strap securing assembly adapted to extend through the first hollow strap sleeve and secure the first hollow strap sleeve to a snowboard; and
    a first extension extending outwardly from the first end of the strap sleeve and a second extension extending outwardly from the second end of the first strap sleeve such that the first and second extensions support the first strap above the first strap sleeve.

2. The snowboard conversion kit according to claim 1, wherein the first strap comprises a flexible member.

3. The snowboard conversion kit according to claim 1, wherein the first strap sleeve comprises:
    a bottom end located between the first end and the second end and being adapted to engage the snowboard; and
    a top end having the cutout.

4. The snowboard conversion kit according to claim 1, wherein the first strap end is located on top of the second strap end and wherein the securing assembly extends through the first strap end and the second strap end.

5. The snowboard conversion kit according to claim 1, wherein the first strap assembly is adapted to be affixed to a snowboard in a lateral direction.

6. The snowboard conversion kit according to claim 1, wherein the first strap securing assembly is located between the first strap and the first strap sleeve.

7. The snowboard conversion kit according to claim 1, wherein the first strap comprises an infinite loop.

8. The snowboard conversion kit according to claim 1, wherein the first strap securing assembly is located at the cutout.

9. The snowboard conversion kit according to claim 1, wherein the sleeve is adapted to be mounted on a rear portion of a snowboard at a first non-longitudinal angle.

10. The snowboard conversion kit according to claim 9, wherein the first angle comprises an orthogonal angle.

11. The snowboard conversion kit according to claim 1, wherein the first strap sleeve has a central cutout.

12. The snowboard conversion kit according to claim 11, wherein the first strap assembly securing member is secured to the snowboard through the central cutout in the first strap sleeve.

13. The snowboard conversion kit according to claim 1, wherein the first strap is constructed from a flexible member.

14. A snowboard conversion kit comprising:
- a first strap assembly having:
  - a first hollow strap sleeve having a first end, a second end, distal from the first end, and a cutout between the first end and the second end;
  - a first strap having a first strap end extending into the first hollow strap sleeve from the first end and a second strap end extending into the first hollow strap sleeve from the second end, the first strap and the first strap sleeve forming a loop; and
  - a first strap securing assembly adapted to extend through the first hollow strap sleeve and secure the first hollow strap sleeve to a snowboard; and
- a second strap assembly having:
  - a second hollow strap sleeve having a first end, a second end, distal from the first end, and a cutout between the first end and the second end;
  - a second strap extending into the second hollow strap sleeve and forming a loop; and
  - a second strap securing assembly adapted to extend through the second hollow strap sleeve and secure the second hollow strap sleeve to the snowboard.

15. The snowboard conversion kit according to claim 14, wherein the first strap assembly is adapted to be affixed to a rear portion of the snowboard and wherein the second strap assembly is adapted to be affixed to a forward portion of the snowboard.

16. The snowboard conversion kit according to claim 14, wherein the first strap is smaller than the second strap.

* * * * *